March 11, 1924.    1,486,248
J. JEFFERY ET AL
SIGNAL
Filed June 23, 1922    2 Sheets-Sheet 1

Harry Snyder
Joseph Jeffery
INVENTOR

BY Victor J. Evans
ATTORNEY

WITNESS:

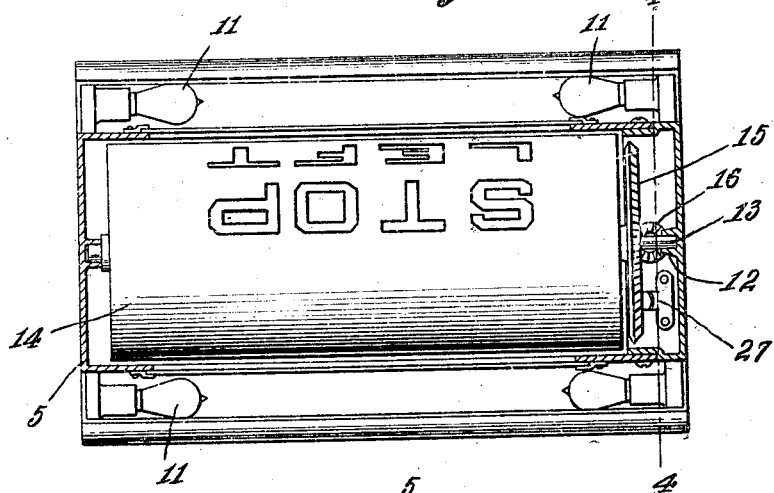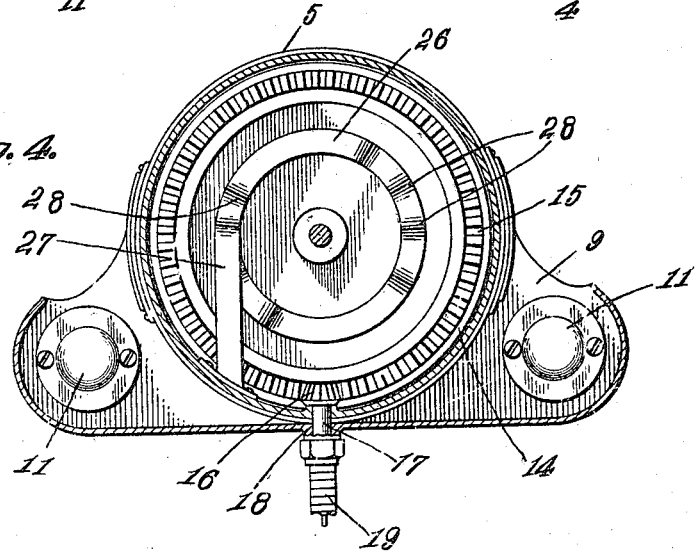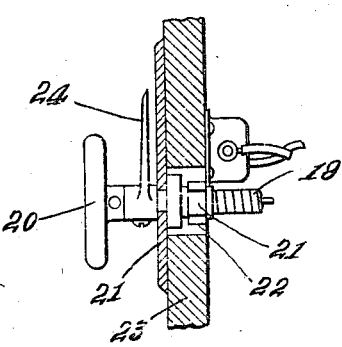

Patented Mar. 11, 1924.                                                         1,486,248

UNITED STATES PATENT OFFICE.

JOSEPH JEFFERY AND HARRY SNYDER, OF BANGOR, MAINE.

SIGNAL.

Application filed June 23, 1922. Serial No. 570,389.

*To all whom it may concern:*

Be it known that we, JOSEPH JEFFERY and HARRY SNYDER, the former a subject of the King of Great Britain, the latter a subject of Russia, residing at Bangor, in the county of Penobscot and State of Maine, have invented new and useful Improvements in Signals, of which the following is a specification.

Our present invention has reference to a direction signal for automobiles and similar vehicles.

Our object is to produce an extremely simple, cheap and effective device which is arranged on a conspicuous place on the vehicle and whereby drivers and pedestrians to both the front and rear of the vehicle will have visible warning as to the course the vehicle is to take.

A further object is to produce a direction signal for vehicles which can successfully be employed in both day and night.

The foregoing, and other objects which will present themselves as the nature of the invention is better understood, may be accomplished by a construction, combination and operative association of parts such as is disclosed by the drawings which accompany and which form part of this application.

In the drawings:—

Figure 3 is a similar sectional view on the line 3—3 of Figure 1.

Figure 4 is a sectional view on the line 4—4 of Figure 3.

Figure 5 is an enlarged sectional view approximately on the line 5—5 of Figure 1.

Figure 1:
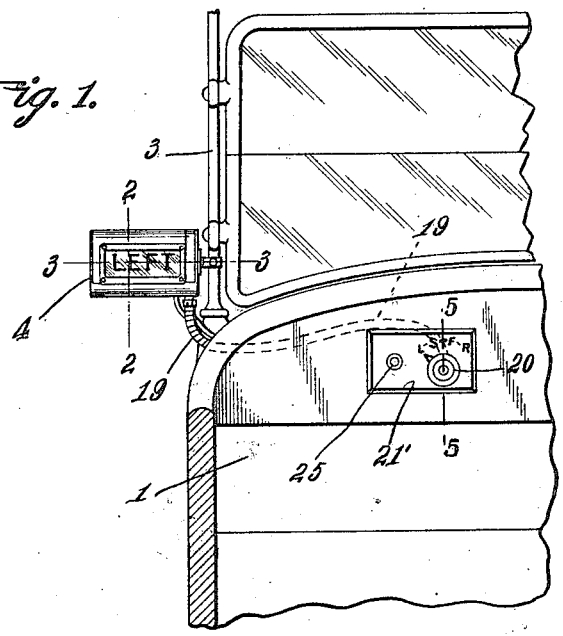
Figure 1 is a view of a sufficient portion of a vehicle to illustrate the application of the improvement thereon, a part of the vehicle being in section.
Figure 2:
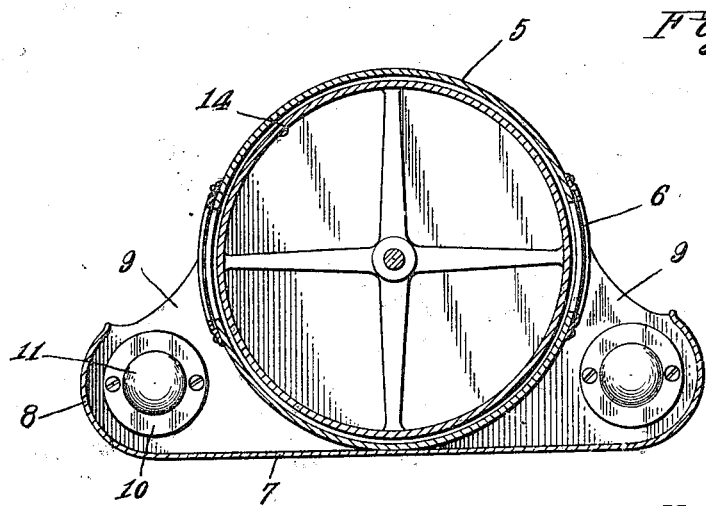
Figure 2 is an enlarged sectional view on the line 2—2 of Figure 1.

While we have illustrated, in Figure 1 of the drawings, our improvement applied to one of the supports of the windshield of an automobile and while the same is preferably so positioned, it is to be understood that our improvement may be arranged upon any part of the vehicle.

Referring now to the drawings in detail, the numeral 1, in Figure 1, illustrates a sufficient portion of an automobile to disclose the application of the improvement. As shown in the said figure there is clamped, as at 2, to one of the posts 3 that provide the supporting frame for the windshield the casing 4 of our improvement. The casing includes a cylindrical body portion 5 provided on both of its front and rear faces with openings closed by preferably removable transparent plates 6 and whereby the interior of the casing is visible from both the front and rear thereof. The casing is so constructed that one of the ends thereof is removable. The casing includes a straight base portion 7 attached in any desired manner to the lower center of the cylindrical portion 5. The base 7 has its ends rounded outwardly, as at 8, and the sides thereof are connected to the sides of the cylindrical portion 5. This arrangement provides compartments 9 respectively to the lower sides of the cylindrical portion 5, and arranged in the ends of these receptacles 9 there are sockets 10 for incandescent bulbs 11. Preferably the inner faces of the rounded ends 9 of the compartments are polished to produce reflective surfaces whereby the rays of light from the bulbs 11 will be directed to the sight openings 6.

The ends of the cylinder 5 are centrally formed with socket bearings 12 for the stub shafts or trunnions 13 formed on the ends of a cylindrical drum 14. The drum, at diametrically opposed points on the faces thereof has printed the words "Left," "Stop," "Forward," and "Right," and such signal warnings are designed to be brought opposite the opposed sight openings in a manner which will now be described.

On the inner or righthand trunnion 13 there is secured a comparatively large beveled gear 15. In mesh with this gear there is a pinion 16. The pinion has a shaft 17 journaled in a bearing 18 in the bottom of the casing of the improvement, the said shaft 17 being connected to a flexible shaft 19 that leads to the dashboard of the machine 1. The shaft 19, as disclosed in Figure 5 of the drawings, has its end connected to a turnable member or shaft that has its outer end provided with an operating handle 20. The shaft 21, for the said end of the flexible shaft 19 has a reduced portion which is journaled in a bearing opening in a plate 21', the shaft proper passing through an opening 22 in the instrument board 23 of the machine. Inward of the operating handle 20 there is secured on the shaft 21 a finger 24, and on the plate 21' there is inscribed the letters "L," "S," "F" and "R,"

arranged in spaced relation to each other. The plate 21′ has also arranged thereon a push button 25 which operates a suitable switch that controls the electricity between the conductors for the bulbs 11 and the source of electricity for the automobile.

Either on one of the faces of the gear 15 or on one of the ends of the drum 14 there are circumferentially arranged spaced substantially V-shaped indentures 26 respectively arranged opposite the respective stop signals on the drum. Having one of its ends secured in the cylindrical casing 1 there is a flat spring 27. This spring has its free end provided with a substantially V-shaped tooth 28 that is designed to be successively received in the respective indentures 26 whereby to hold the drum against accidental rotation. If desired, in addition to the indentures arranged in a line with the warning signals on the drum an additional indenture may be provided, the latter receiving the tooth of the spring member 27 when the flexible shaft is turned to bring a blank space opposite the sight openings, but in practice it is thought that this will scarcely be required.

It is thought that the construction and the operation of the improvement will be obvious from the foregoing description when taken in connection with the drawings. By turning the knob or handle 20 so that the finger 24 is brought opposite the character "L" on the plate 21′, the flexible shaft 19 will be turned sufficiently to rotate the pinion and cause the latter to turn the gear 15 to revolve the drum to bring the signals "Left" opposite the respective sight openings 6 in the front and rear of the casing 5. When so turned, the tooth 28 of the spring catch member 27 will be received in one of the depressions 26 to hold the drum from accidental turning. After the vehicle has turned to the left, the operator again turns the knob or handle 20 to cause the drum 14 to bring the finger opposite the letter "F" on the plate 21′ to rotate the drum to bring the signals "Forward" opposite the respective openings in the casing, the drum being operated in a similar manner to bring the signals "Stop" and "Right" opposite the sight openings, and as stated when the vehicle is not in use, the drum may still further be rotated, so that a blank on the drum will appear to the rear of the sight openings when the vehicle is not in use, or is to stand idle for an indefinite period. In night driving, the push button 25 is operated simultaneously with the knob or handle 20 so that the signals will be illuminated.

Having described the invention, we claim:—

1. In a device of the character described, a casing including a cylindrical body having display openings at its front and rear, and having a straight base projecting beyond the sides of the casing and terminating in upwardly rounded ends, side members for the base extensions connected to the periphery of the casing, and said extensions providing lamp housings, an indicia bearing drum journaled in the casing, means for turning the same to bring indicia thereof in a line with the sight openings in the casing, and means for illuminating the lamps in the lamp housings.

2. A casing including a cylindrical body having its opposite faces provided with sight openings, a flat base on the casing extending beyond the sides thereof and having upturned sides which are connected to the periphery of the casing, lamps on said sides, an indicia bearing drum journaled in the casing, a beveled gear on the shaft thereof, said wheel having its face formed with circumferentially arranged spaced indentures arranged in a radial line with respect to the indicia on the drum, a flat spring member secured in the casing having a V-shaped tooth to engage in one of the indentures to hold the beveled gear and drum from free turning, a pinion in mesh with the beveled gear and having its shaft journaled through the casing, means for turning said shaft to revolve the gear and drum, and means for illuminating the lamps in the lamp housings.

In testimony whereof we affix our signatures.

JOSEPH JEFFERY.
HARRY SNYDER.